United States Patent
Ryu et al.

(10) Patent No.: US 11,308,704 B2
(45) Date of Patent: Apr. 19, 2022

(54) MOBILE TERMINAL FOR CONTROLLING VR IMAGE AND CONTROL METHOD THEREFOR

(71) Applicant: LG ELECTRONICS INC., Seoul (KR)

(72) Inventors: Eunjeong Ryu, Seoul (KR); Youngjun Kim, Seoul (KR); Wonjoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 878 days.

(21) Appl. No.: 16/071,072

(22) PCT Filed: Jan. 18, 2016

(86) PCT No.: PCT/KR2016/000497
§ 371 (c)(1),
(2) Date: Jul. 18, 2018

(87) PCT Pub. No.: WO2017/126709
PCT Pub. Date: Jul. 27, 2017

(65) Prior Publication Data
US 2021/0192854 A1    Jun. 24, 2021

(51) Int. Cl.
*G06T 19/20* (2011.01)
*G06T 7/73* (2017.01)
(Continued)

(52) U.S. Cl.
CPC .............. *G06T 19/20* (2013.01); *G06F 3/017* (2013.01); *G06K 9/00355* (2013.01);
(Continued)

(58) Field of Classification Search
CPC ........... G06T 19/20; G06T 7/571; G06T 7/73; G06T 2219/2016; G06T 2200/24;
(Continued)

(56) References Cited

U.S. PATENT DOCUMENTS 9,218,064 B1 * 12/2015 Li .................... G06F 3/0488
2004/0039496 A1 * 2/2004 Dautelle ............. G08G 5/0082
701/3
(Continued)

FOREIGN PATENT DOCUMENTS

WO    2014150728    9/2014
WO    2015111778    7/2015

OTHER PUBLICATIONS

PCT International Application No. PCT/KR2016/000497, Written Opinion of the International Searching Authority dated Sep. 30, 2016, 11 pages.

*Primary Examiner* — Jitesh Patel
(74) *Attorney, Agent, or Firm* — Lee, Hong, Degerman, Kang & Waimey PC

(57) ABSTRACT

The present invention relates to a mobile terminal and a control method therefor, the mobile terminal comprising: at least one camera; a display unit placed toward the eyes of a user searing the mobile terminal and for displaying an image, the image comprising one of a VR (virtual reality) image and a 3D image; and a control unit for performing an action related to the image according to a gesture input sensed by the camera, wherein, when a first gesture input proceeding along a first plane opposite to the image is sensed or a second gesture input proceeding along a second plane orthogonal to the first plane is sensed by the camera, the control unit performs an action corresponding to the sensed first or second gesture input, thereby providing the user with an effect of providing more various VR related functions through the first gesture input made on a first plane space opposite to the image visible to the eyes of the user and the second gesture input made on a second plane space orthogonal to the first plane.

18 Claims, 21 Drawing Sheets

(51) Int. Cl.
*G06T 7/571* (2017.01)
*G06F 3/01* (2006.01)
*G06K 9/00* (2022.01)

(52) U.S. Cl.
CPC ............... *G06T 7/571* (2017.01); *G06T 7/73* (2017.01); *G06T 2219/2016* (2013.01)

(58) Field of Classification Search
CPC . G06T 2207/20081; G06T 2207/20084; G06T 2207/30242; G06T 7/0008; G06T 7/001; G06F 3/017; G06F 3/01; G06K 9/00355; G06K 9/00671; H04M 1/725; H04M 1/724
See application file for complete search history.

(56) References Cited

U.S. PATENT DOCUMENTS

| | | | |
|---|---|---|---|
| 2012/0313848 A1 | 12/2012 | Galor et al. | |
| 2013/0073619 A1* | 3/2013 | Tumuluri | H04N 13/194 709/204 |
| 2013/0326425 A1* | 12/2013 | Forstall | G06T 17/05 715/851 |
| 2014/0225918 A1 | 8/2014 | Mittal et al. | |
| 2015/0169070 A1* | 6/2015 | Harp | G02B 27/017 345/419 |
| 2015/0185851 A1* | 7/2015 | Kauffmann | G06K 9/00335 345/156 |
| 2016/0062636 A1* | 3/2016 | Jung | G06F 3/04817 715/762 |

* cited by examiner

FIG. 2
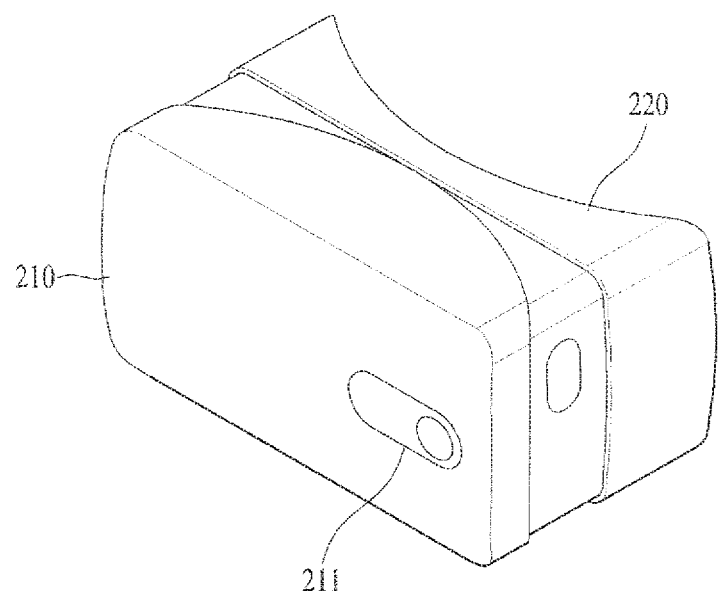
(a)
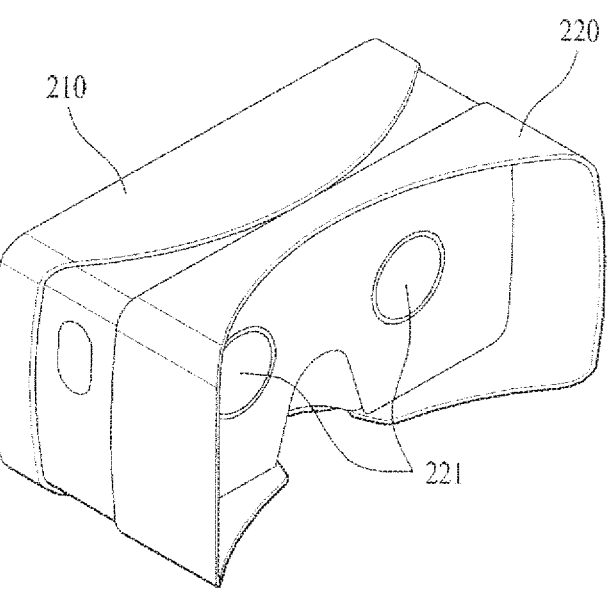
(b)

FIG. 8
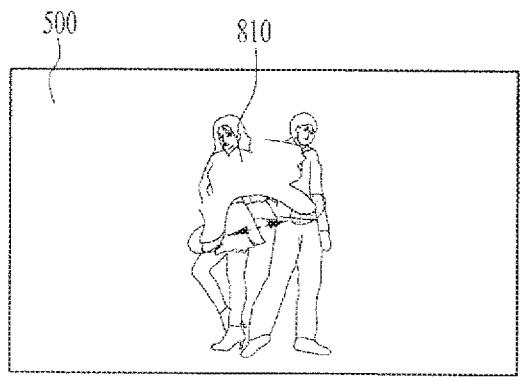 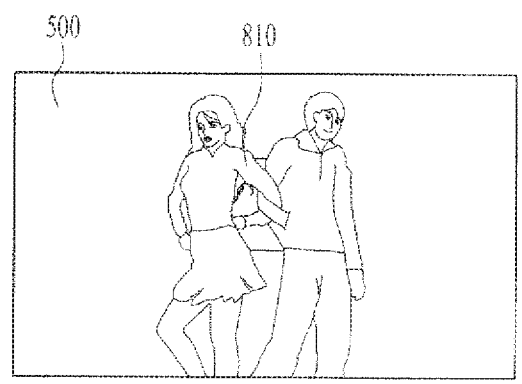
(a)
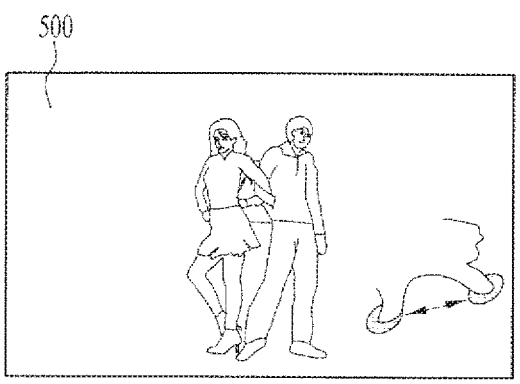 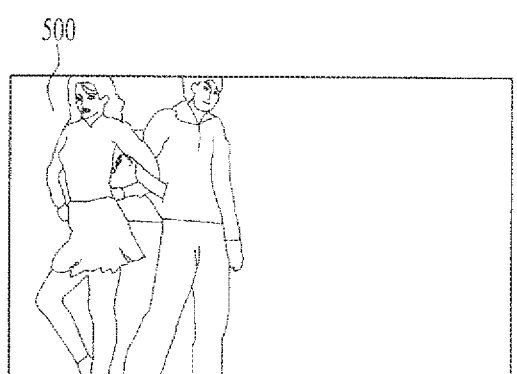
(b)

FIG. 9
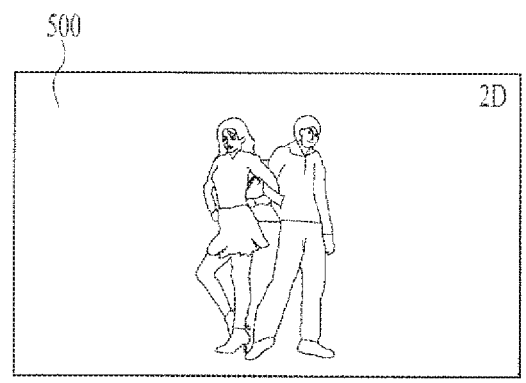
(a)
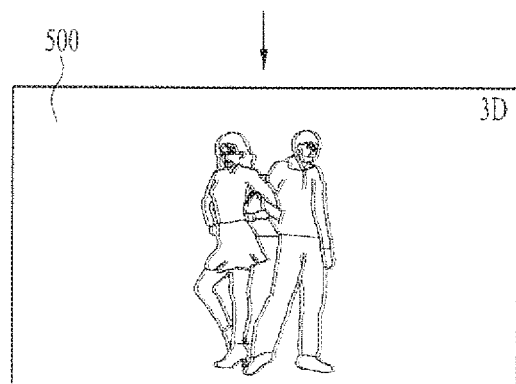
(b)

FIG. 10
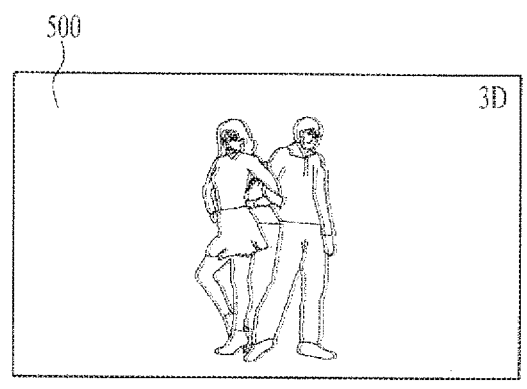
(a)
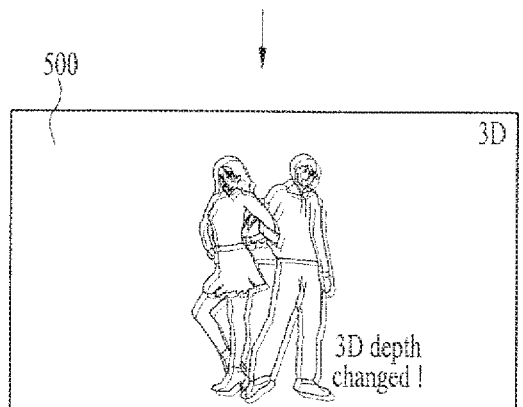
(b)

FIG. 11
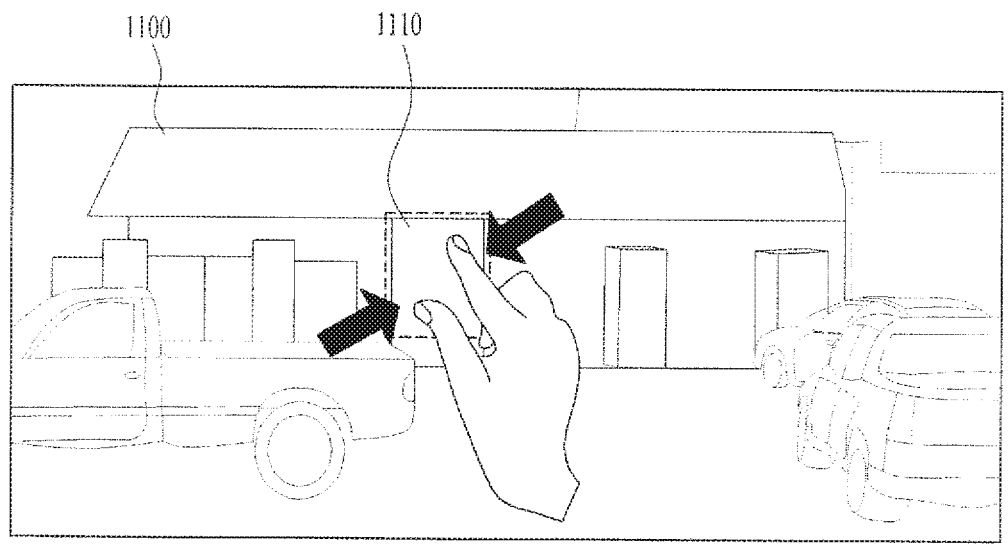
(a)
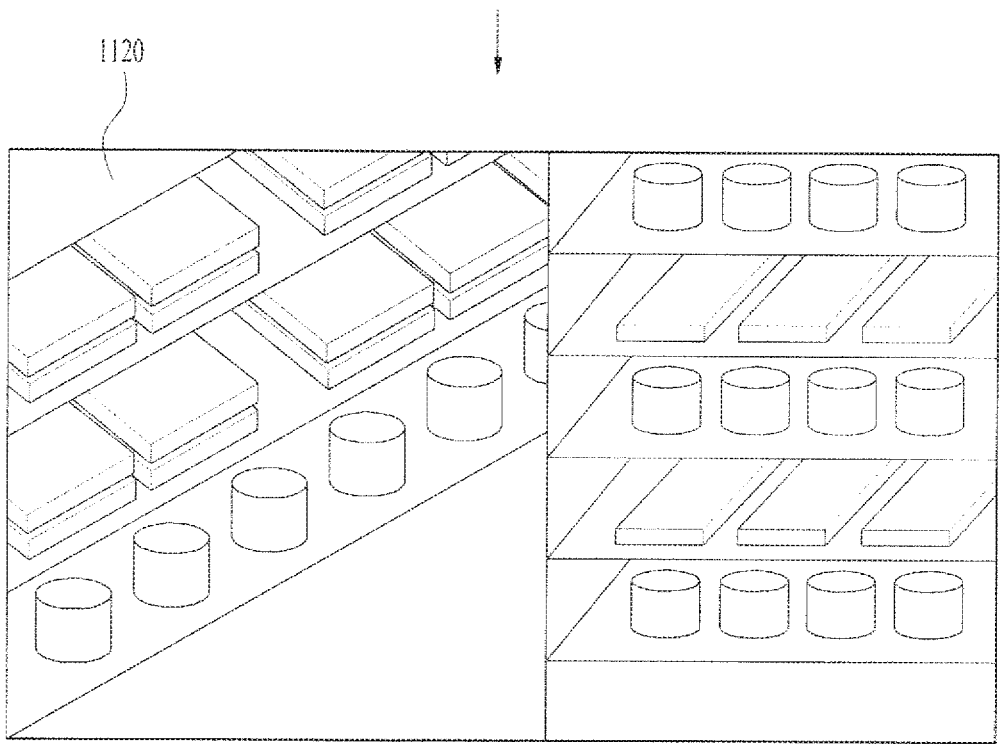
(b)

FIG. 12
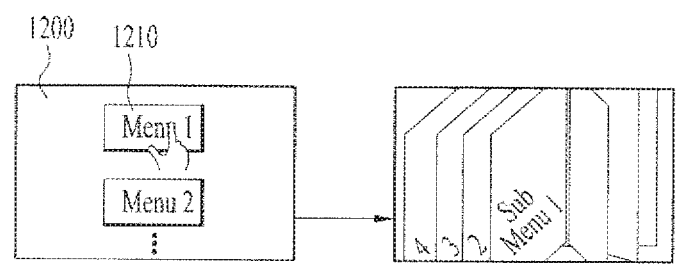
(a)
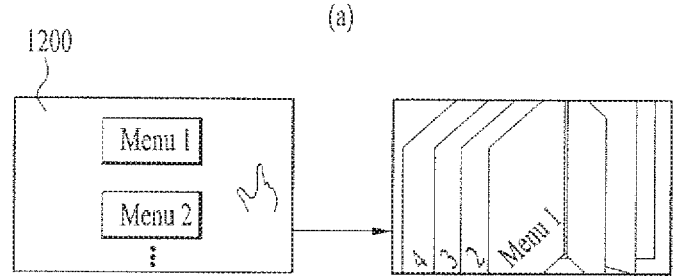
(b)

FIG. 14
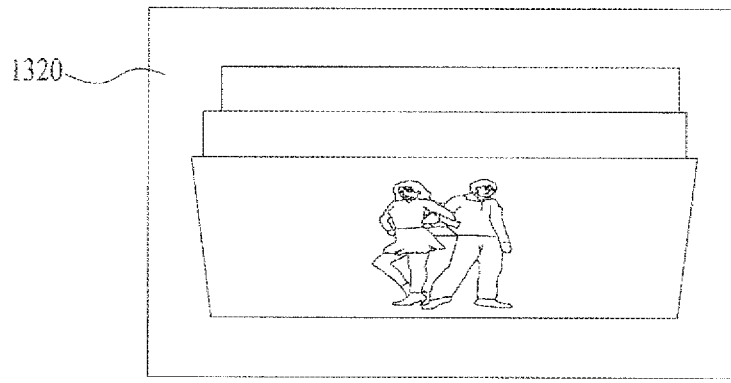
(a)
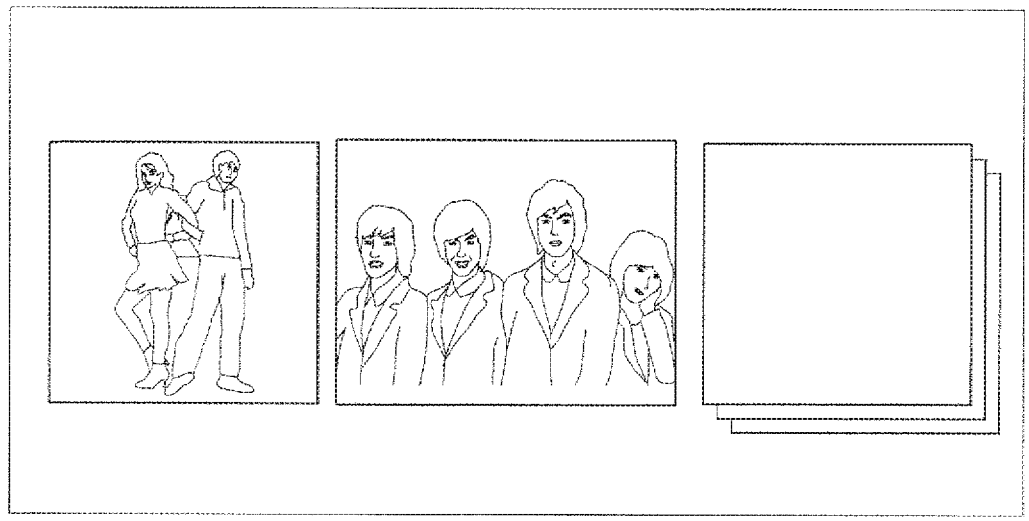
(b)

FIG. 18
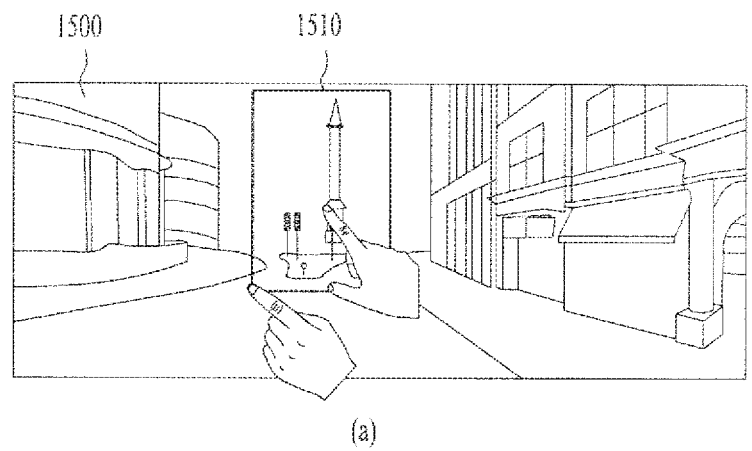
(a)
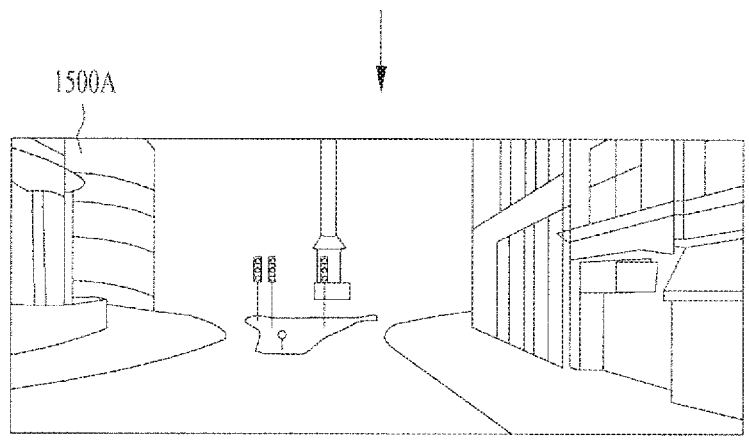
(b)

MOBILE TERMINAL FOR CONTROLLING VR IMAGE AND CONTROL METHOD THEREFOR

CROSS-REFERENCE TO RELATED APPLICATIONS

This application is the National Stage filing under 35 U.S.C. 371 of International Application No. PCT/KR2016/000497, filed on Jan. 18, 2016, the contents of which are all hereby incorporated by reference herein in their entirety.

TECHNICAL FIELD

The present invention relates to a mobile terminal and controlling method thereof, suitable for performing user authentication through a camera.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Some mobile terminals include additional functionality which supports game playing, while other terminals are configured as multimedia players. More recently, mobile terminals have been configured to receive broadcast and multicast signals which permit viewing of content such as videos and television programs.

To support and increase the mobile terminal functions, it may be able to consider the improvement of structural parts and/or software parts of the mobile terminal.

Recently, the technology for experiencing virtual reality by installing a mobile terminal in a VR (virtual reality) device is getting popularized.

Namely, a mobile terminal can stereoscopically provide users with information related to an object such as a building, a thing and the like in a 3D virtual space or a real space.

Moreover, while a VR image is displayed, a mobile terminal recognizes a VR gesture according to user's hand gesture in an image received by real time through a camera and is then able to perform an action corresponding to the recognized VR gesture.

However, there is a problem that various actions related to VR cannot be currently provided using user's various hand gestures.

DISCLOSURE OF THE INVENTION

Technical Tasks

Accordingly, the present invention is directed to substantially obviate one or more problems due to limitations and disadvantages of the related art. One technical task of the present invention is to provide a mobile terminal and controlling method thereof for recognizing a first VR gesture and a second VR gesture made in a first plane opposing a VR image appearing to user's eyes and a second plane orthogonal to the first plane and performing a first action and a second action corresponding to the recognized first VR gesture and the recognized second VR gesture, respectively.

Technical Solution

In one technical aspect of the present invention, provided herein is a mobile terminal, including at least one camera, a display unit disposed toward eyes of a user wearing the mobile terminal, the display unit configured to display an image, the image comprising one of a VR (virtual reality) image and a 3D image, a controller configured to perform an action related to the image in response to a gesture input detected through the camera, when a first gesture input proceeding along a first plane opposing the image or a second gesture input proceeding a second plane orthogonal to the first plane is detected through the camera, the controller configured to perform an action corresponding to the sensed first or second gesture input.

In another technical aspect of the present invention, provided herein is a method of controlling a mobile terminal, including displaying an image, the image comprising one of a VR (virtual reality) image and a 3D image, recognizing a first gesture input proceeding along a first plane opposing the image is detected through a camera, performing a first action corresponding to the detected first gesture input, recognizing a second gesture input proceeding a second plane orthogonal to the first plane is detected through the camera, performing a second action corresponding to the detected second gesture input.

Advantageous Effects

Effects of a mobile terminal and controlling method thereof according to the present invention are described as follows.

According to at least one of embodiments of the present invention, through a first VR gesture made in a first plane space opposing a VR image appearing to user's eyes and a second VR gesture made in a second plane space orthogonal to the first plane, various VR related functions can be provided to the user.

DESCRIPTION OF DRAWINGS

FIG. 1B and FIG. 10 are conceptual diagrams for one example of a mobile terminal related to the present invention in different views.

FIG. 2 is a diagram to describe one example of a VR device connected to a receiving side mobile terminal according to one embodiment of the present invention.

FIGS. 5 to 8 are diagrams to describe a process for changing a zoom magnification of a VR image using a first or second VR gesture.

FIGS. 9 to 11 are diagrams to describe a process for performing an action related to 3D (3 dimensions) of a VR image using a first VR gesture and/or a second VR gesture.

FIGS. 12 to 14 are diagrams to describe a process for displaying objects in a VR image by scrolling them using a first VR gesture and/or a second VR gesture.

FIGS. 15 to 20 are diagrams to describe a process for controlling a display operation of a specific region in a VR image using a first VR gesture and/or a second VR gesture.

MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
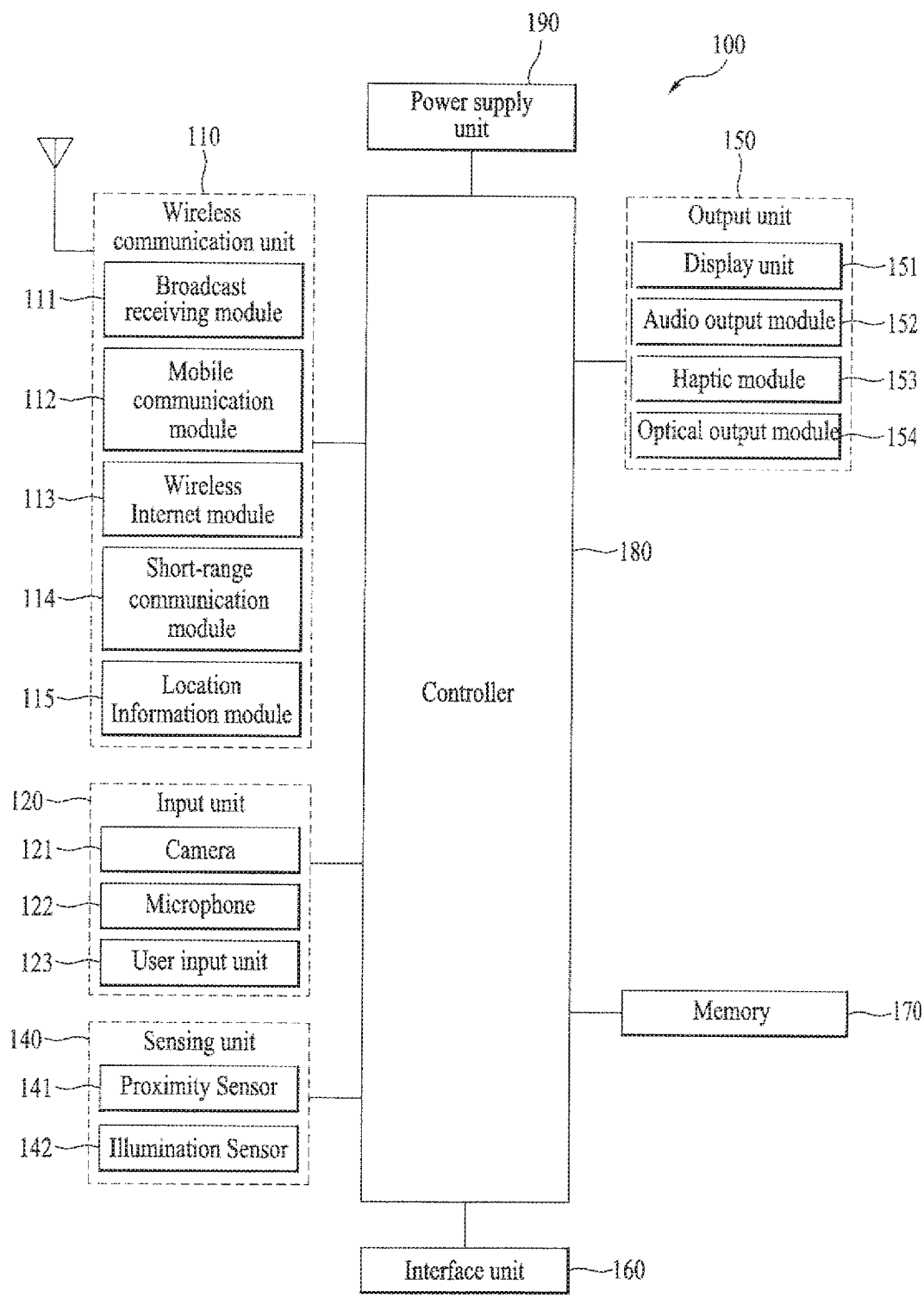
FIG. 1A is a block diagram to describe a mobile terminal related to the present invention.
Figure 1B:
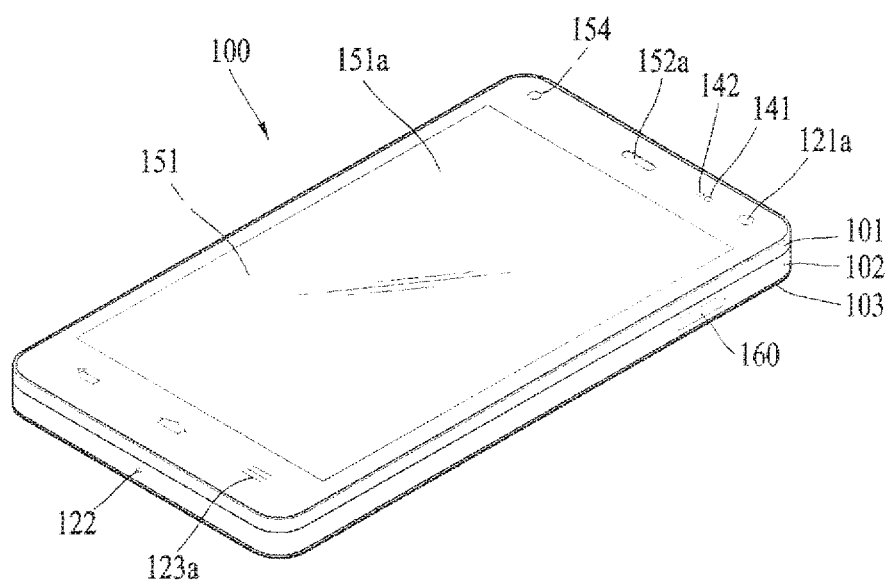
Figure 1C:
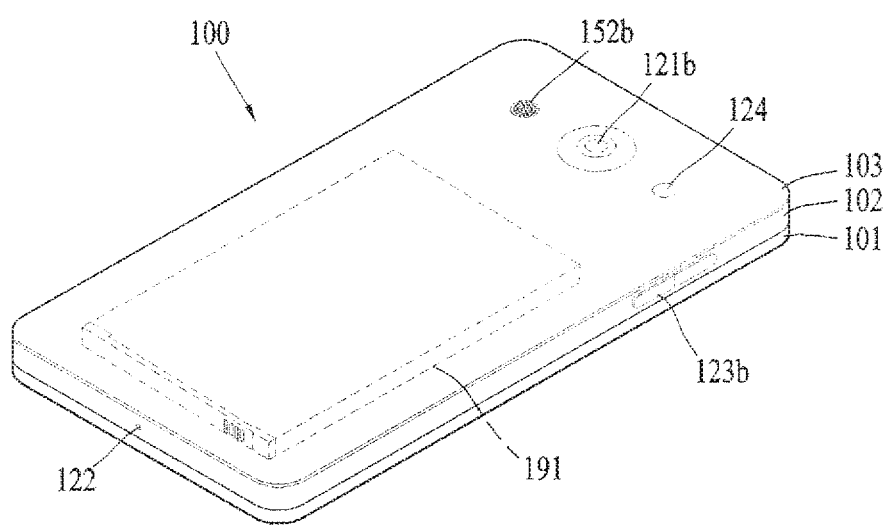

Reference is now made to FIGS. 1A-1C, where FIG. 1A is a block diagram of a mobile terminal in accordance with the present disclosure, and FIGS. 1B and 10 are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

For instance, the wireless communication unit 110 typically includes one or more components which permit wireless communication between the mobile terminal 100 and a wireless communication system or network within which the mobile terminal is located.

The wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, and the like) for allowing a user to input information. Data (for example, audio, image, and the like) is obtained by the input unit 120 and may be analyzed and processed by controller 180 according to user commands thereof.

The sensing unit 140 is typically implemented using one or more sensors configured to sense internal information of the mobile terminal, the surrounding environment of the mobile terminal, user information, and the like. For example, in FIG. 1A, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

Moreover, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components can cooperatively operate to implement operations, controls and controlling methods of the mobile terminal according to various embodiments described in the following. The operations, controls or controlling methods of the mobile terminal can be implemented on the mobile terminal by running at least one application program saved to the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi) and Wi-Fi Direct, and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100).

The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114.

Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof.

In this case, the terminal body can be construed as the concept of indicating the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, first and second audio output modules 151a and 151b, a proximity sensor 141, an illumination sensor 142, an optical output module 154, first and second cameras 121a and 121b, first and second manipulation units 123a and 123b, a microphone 122, interface unit 160 and the like.

It will be described for the mobile terminal as shown in FIGS. 1B and 10. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged.

For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display an execution screen information of an application operated in the mobile terminal or User Interface, Graphic User Interface corresponding to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

Moreover, the display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like.

In the present drawing, the first manipulation unit 123a is a touch key for example, by which the present invention is non-limited. For instance, the first manipulation unit 123 may include a push key (i.e., a mechanical key) or a combination of the touch key and the push key.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

A flash 124 is shown adjacent to the second camera 121*b*. When an image of a subject is captured with the camera 121*b*, the flash 124 may illuminate the subject.

The second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

The battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A VR image according to the present invention may mean an image having a depth recognized by a user at a view angle (angle of view) over a preset angle. The depth can be recognized by user's eyes in a manner that the VR image is rendered into a 3D image. The VR image may include a still image or a moving picture image. In some cases, the VR image may be called a VR content. The view angle of the VR image is wider than that of the camera 121 generally built in the mobile terminal 100 and may be equal to or greater than 100 degrees for example.

While the mobile terminal 100 is installed in a separate VR device, it is able to display the VR image on the display unit 151. If a display unit 151 is not included in the VR device, the mobile terminal 100 may be directly installed in the VR device. If a display unit 151 is included in the VR device, the mobile terminal 100 may be connected to the VR device by wire/wireless.

FIG. 2 is a diagram to describe one example of a VR device connected to a receiving side mobile terminal according to one embodiment of the present invention.

A VR device 200 according to one embodiment of the present invention may include a first case 210 and a second case 220. The VR device 200 may further include a band (not shown) to be worn on user's head.

At least one portion of the first case 210 can be separated from the second case 220. The first case 210 may include an installation portion inside so as to install the mobile terminal 100 therein. The mobile terminal 100 can be disposed in a manner that a backside and a front side are adjacent to the first case 210 and the second case 220, respectively. The first case 210 may have a hole 211 for exposing the rear camera 121 of the mobile terminal 100 while the mobile terminal 100 is installed in the VR device 200. According to an embodiment, the first case 210 may include a port for connecting the mobile terminal 100.

The second case 220 is a part that comes into contact with user's head when the user wears the VR device 200. The second case 220 includes lenses 221 corresponding to both eyes of the user when the user wears the VR device 200. For example, the lenses 221 may include fisheye lenses, wide-angle lenses and the like to distort a screen to raise a field of view (FOV) of a user.

According to an embodiment, the second case 220 may have a proximity sensor provided to a part coming into contact with user's head when the user wears the VR device 200. The VR device 200 may determine whether the user wears the VR device 200 using the proximity sensor. Moreover, based on a presence or non-presence of pulling a band and a level of pulling a band, the VR device 200 may determine whether the user wears the VR device 200.

The VR device 200 may include a sensing unit including a gyroscope sensor, a motion sensor and the like. Based on data sensed by the sensing unit, the VR device 200 can determine a motion, position, rotation and rotation extent of a head of a user wearing the VR device 200 and the like.

Moreover, according to an embodiment, the VR device 200 may include an eye tracking module for tracking eyes of a user wearing the VR device 200. For example, the eye tracking module may include a camera for obtaining an image of user's eyes and an IR sensor for applying IR rays to user's eyes. The VR device 200 can track the user's eyes by determining positions and motions of dots marked on the user's eyes by the applied IR rays based on the image obtained by the camera.

Moreover, according to an embodiment, the VR device 200 may further include a user interface unit for receiving a user command. For example, a touch pad for receiving user's touch command may be provided to a lateral side of an exterior of the second case 220.

A process for recognizing a first VR gesture and a second VR gesture performed in a first plane opposing a VR image appearing to user's eyes and a second plane orthogonal to the first plane, respectively and performing a first action corresponding to the recognized first VR gesturer and a second action corresponding to the recognized second VR gesture is described in detail with reference to FIGS. 3 to 21 as follows.

Figure 3:
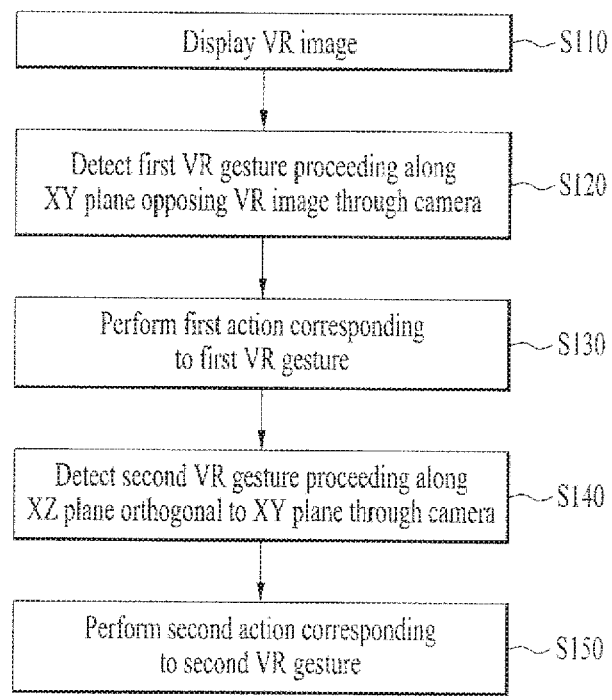
FIG. 3 is a flowchart showing a process for controlling a mobile terminal according to the present invention.

FIG. 3 is a flowchart showing a process for controlling a mobile terminal according to the present invention.

FIGS. 4 to 21 are diagrams to describe a process for controlling a mobile terminal according to the present invention.

Referring to FIGS. 3 to 21, if the VR device 200 is installed in the mobile terminal 100 and a command for entering a VR image mode is received from a user, the controller 180 of the mobile terminal 100 receives a preview image by real time by entering the VR image mode and driving the camera 121, converts the real-time received preview image into a VR image, and then displays the VR image [S110].

In doing so, if the VR device 200 is installed in the mobile terminal 100, the touchscreen 151 of the mobile terminal 100 is disposed toward user's eyes. And, the user can experience virtual reality as if the VR image rendered through the VR device 200 is seen in front.

Meanwhile, the VR image may be displayed in a manner that a content displayed on the touchscreen 151 of the mobile terminal 100 is rendered into a VR image. The content includes all data information-displayable on a screen of the mobile terminal, and may include at least one of a received message/email/SNS message, a specific website/webpage, user's personal information, contacts, a messenger, a photo, a map, an image, a memo, a video, a broadcast image, a schedule, a document, an application running screen and a widget running screen for example. In this case, the controller 180 renders a content currently display on a screen of the mobile terminal 100 by being designated by a user into a VR image through the VR device 200 and then displays the VR image. And, the controller 180 can recognize a VR gesture according to a hand action performed by a user within a photographing range of the camera 121.

Meanwhile, image source files for displaying virtual 3D maps in a background of a VR image respectively are stored in the memory 170. If the VR image mode is entered, the controller 180 displays an item list indicating the 3D maps and is then able to render and display a selected 3D map in the background of the VR image using an image source file corresponding to a 3D map item selected from the item list.

The controller 180 periodically track a VR gesture according to a hand action performed by a user within a photographing range of the camera 121, and is able to identifiably display a shape (e.g., a hand shape, a hand-moving animation, etc.) corresponding to the tracked VR gesture on a currently displayed VR image.

Meanwhile, through the camera 121, the controller 180 detects whether a first VR gesture proceeding along a first plane space opposing a VR image currently displayed as virtual reality in front of user's eyes is inputted [S120]. If the first VR gesture is detected as inputted, the controller 180 performs a first action corresponding to the first VR gesture [S130].

Moreover, through the camera 121, the controller 180 detects whether a second VR gesture proceeding along a second plane space orthogonal to the first plane space is inputted [S140]. If the second VR gesture is detected as inputted, the controller 180 performs a second action corresponding to the second VR gesture [S150].

Here, the first and second actions may be different actions related to an operation of a content currently displayed as a VR image or actions associated with each other.

The first and second VR gestures are described in detail with reference to FIG. 4 as follows.

Figure 4:
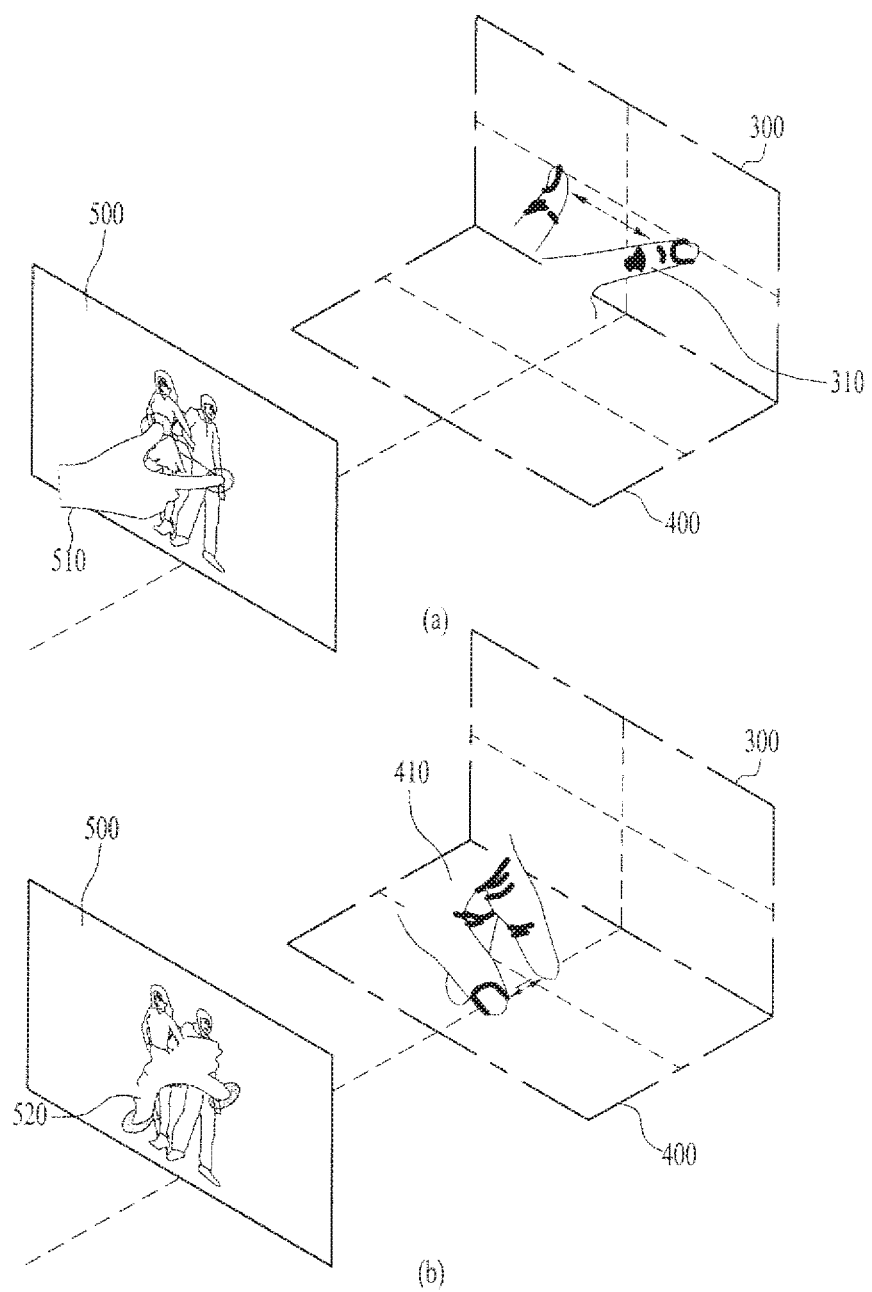
FIG. 4 is a diagram to describe first and second VR gestures according to the present invention.

FIG. 4 is a diagram to describe first and second VR gestures according to the present invention.

FIG. 4 (*a*) shows how a first VR gesture is inputted by a user's hand action along a first plane space.

Namely, a first plane space 300 means an XY plane space opposing a currently displayed VR image 500. A first VR gesture 310 means a pinch-in gesture of decreasing a distance between user's first and second fingers (first and second pointers) in a state that the user's first and second fingers are located at random first and second points in the XY plane space or a pinch-out gesture of increasing a distance between user's first and second fingers (first and second pointers) in a state that the user's first and second fingers are located at random first and second points in the XY plane space.

Here, the controller 180 may recognize an extent of a pinch-in gesture or a pinch-out gesture of the first VR gesture 310 through the camera 121 and perform an action corresponding to the first VR gesture according to the recognized pinch-in or pinch-out extent of the first VR gesture 310 differently.

Once the first VR gesture 310 is recognized in the first plane space 310, the controller 180 can display a cursor 510 having the same shape of the recognized first VR gesture 310 at the corresponding location in the VR image 500. The controller 180 continues to track whether the first VR gesture 310 is changed and is able to display the cursor 510 in the same shape of the changed first VR gesture 310.

Subsequently, FIG. 4 (*b*) shows how a first VR gesture is inputted by a user's hand action along a second plane space.

A second plane space 400 means an XZ plane space orthogonal to the XY plane space opposing a currently displayed VR image 500. A second VR gesture 410 means a gesture of pinching in or out between user's first and second fingers (first and second pointers) in a state that the user's first and second fingers are located at random first and second points in the XZ plane space.

Here, the controller 180 may recognize an extent of a pinch-in gesture or a pinch-out gesture of the second VR gesture 410 through the camera 121 and perform an action corresponding to the second VR gesture according to the recognized pinch-in or pinch-out extent of the second VR gesture 410 differently.

Once the second VR gesture 410 is recognized in the second plane space 410, the controller 180 can display a cursor 520 having the same shape of the recognized second VR gesture 410 at the corresponding location in the VR image 500. The controller 180 continues to track whether the second VR gesture 410 is changed and is able to display the cursor 520 in the same shape of the changed second VR gesture 410.

In the following, a process for changing a zoom magnification of a VR image using a first and/or second VR gesture is described in detail with reference to FIGS. 5 to 8.

FIGS. 5 to 8 are diagrams to describe a process for changing a zoom magnification of a VR image using a first or second VR gesture.

Figure 5:
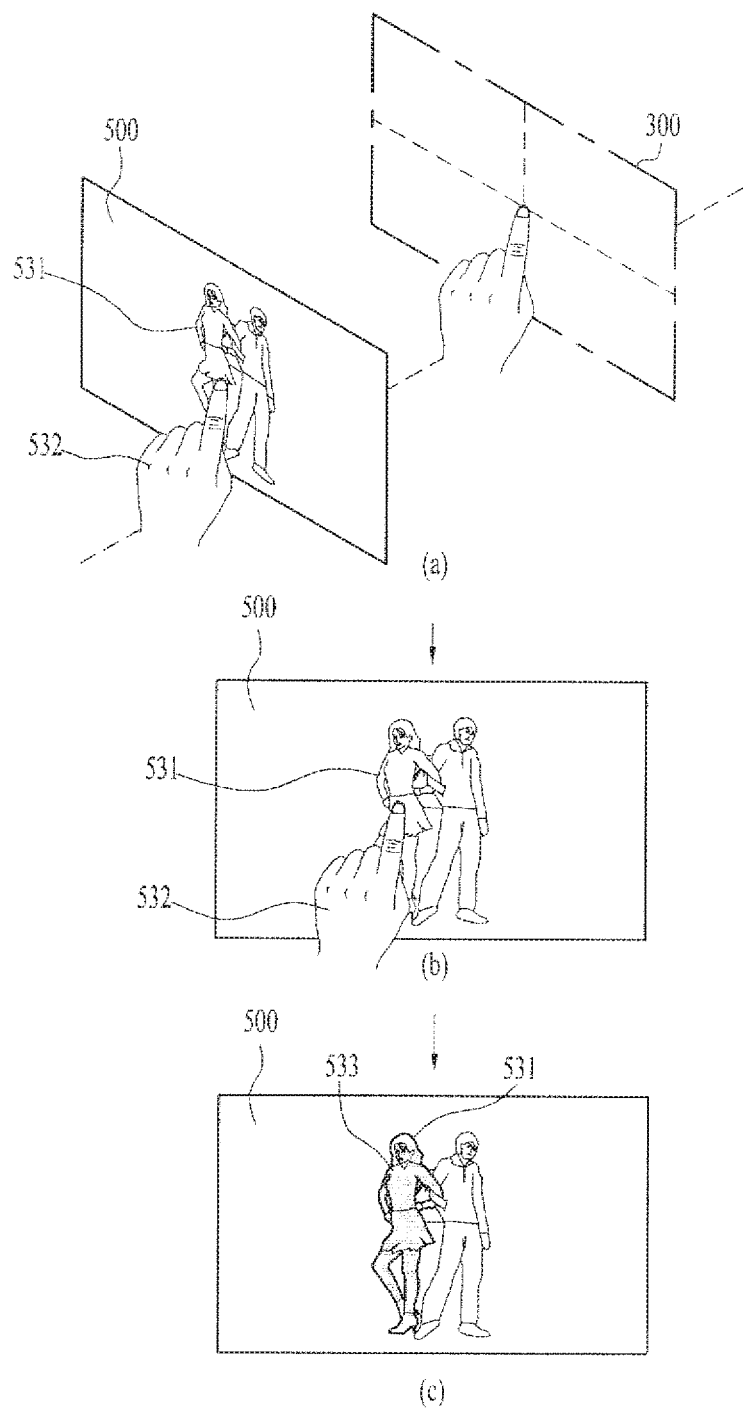

First of all, as shown in FIG. 5 (*a*), if a user's finger (pointer) is located at a position corresponding to a first object 531 within a VR image 500 in a first plane space 300 (or a second plane space 400), the controller 180 continues to track the finger through the camera 121 and displays a cursor 532 in a shape identical or similar to the finger within the VR image 500.

The controller 180 continues to track a moving path of the finger, thereby enabling the cursor 532 to follow the finger.

Subsequently, if the finger stays on the first object 531 over a preset time, the controller 180 recognizes it as user's selection intention on the first object 531 [FIG. 5 (*b*)] and is then able to display information 533, which indicates that the first object 531 is selected, on the first object 531 [FIG. 5 (*c*)]. Here, the information 533 may include at least one of a highlight in a specific color, an outline in a specific color, and an item in a specific shape for feeding back 'the first object 531 is selected' to the user.

Figure 6:
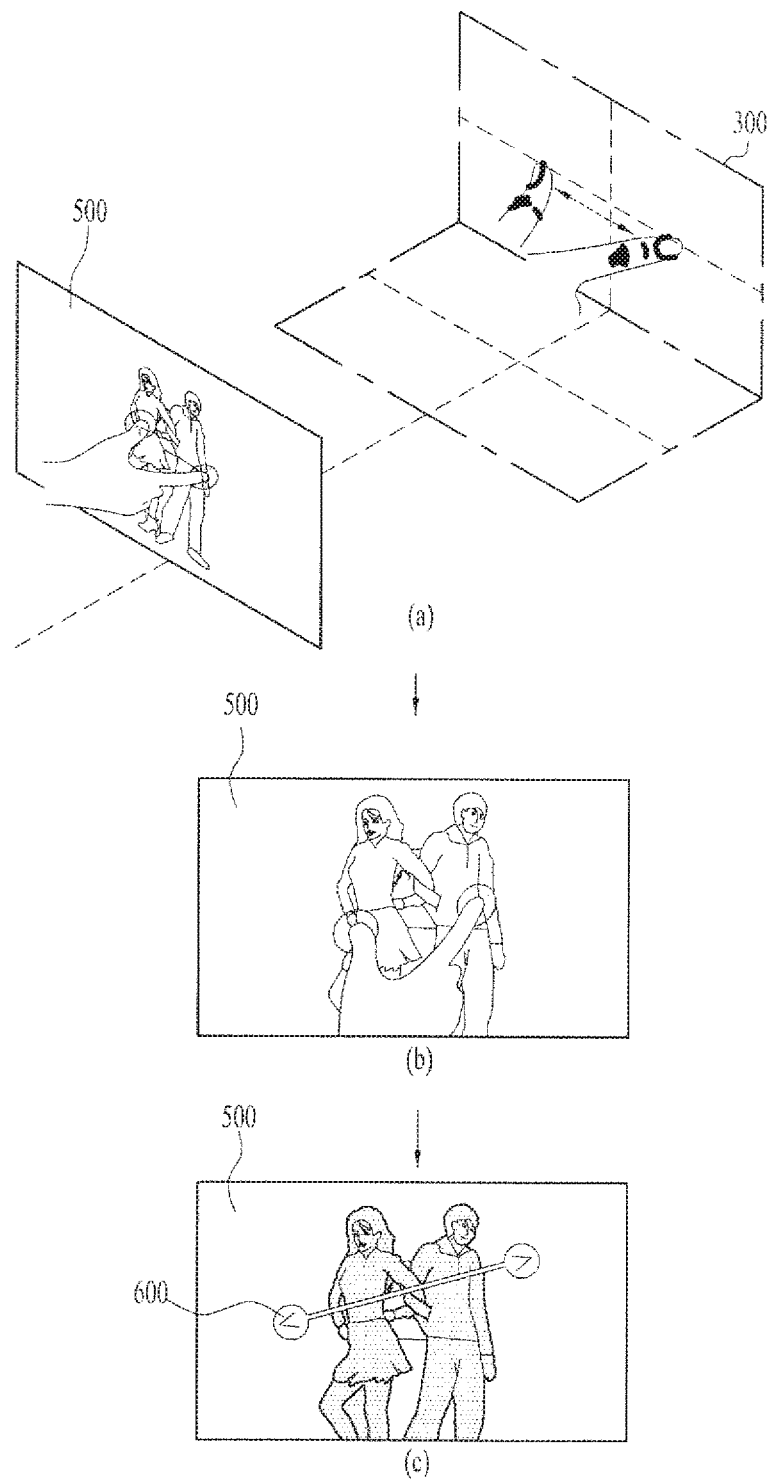

Referring to FIG. 6 (*a*), if user's first and second fingers (pointers) according to a first VR gesture (or a second VR gesture) are located at positions corresponding to a specific region within a VR image 500 in a first plane space 300 (or a second plane space 400), the controller 180 continues to track the first and second fingers according to the first VR gesture (or the second VR gesture) through the camera 121 and displays a cursor in a shape identical or similar to the first and second fingers within the VR image 500.

The controller 180 continues to track a moving path of the fingers, thereby enabling the cursor 532 to follow the fingers.

Subsequently, if the first and second fingers according to the first VR gesture (or the second VR gesture) stay on the specific region in the VR image 500 over a preset time, the controller 180 recognizes it as user's selection intention on the specific region [FIG. 6 (*b*)] and is then able to display information, which indicates that the specific region is selected, on the specific region [FIG. 6 (*c*)]. Here, the information may include at least one of a highlight in a specific color, an outline in a specific color, and an item in a specific shape for feeding back 'the specific region is selected' to the user.

Moreover, the controller 180 can display a user interface (UI) 600 indicating a zoom magnification extent of the selected specific region.

Figure 7:
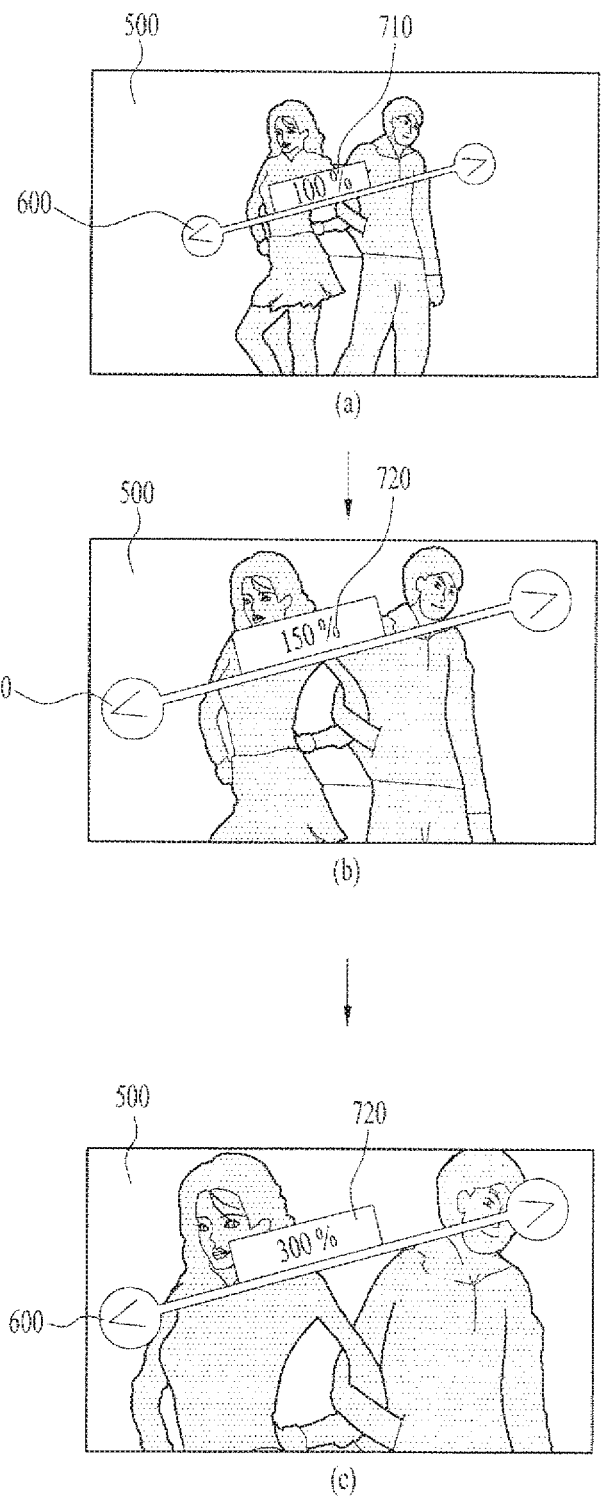

Here, as shown in FIG. 7, the controller 180 can zoom in to or out from (enlarge or reduce) the selected specific region (or the selected object 531 in FIG. 5) in proportion to an extent of pinch-in or pinch-out of a first VR gesturer (or a second VR gesture) inputted by a user.

Namely, as shown in FIG. 7 (*a*), the controller 180 displays a first information 710, which indicates a current zoom magnification of the selected specific region, on the UI 600. As shown in FIG. 7 (*b*), the controller 180 zooms in to the selected specific region in proportion to an extent of the pinch-out of the first VR gesture (or the second VR gesture) inputted by a user and displays a second information 720, which indicates the zoom-in magnification, on the UI 600.

Moreover, as shown in FIG. 7 (*c*), if the extent of the pinch-out of the first VR gesture (or the second VR gesture) is increased again by the user, the controller 180 zooms in to the selected specific region again in proportion to the increased extent of the pinch-out and displays a third information 730, which indicates the zoom-in magnification, on the UI 600.

Moreover, the controller 180 may zoom out from the selected specific region in proportion to the extent of the pinch-in of the first VR gesture (or the second VR gesture) inputted by the user and display information, which indicates the zoom-out magnification, on the UI 600.

As shown in FIG. 8 (*a*), if a first VR gesture (or a second VR gesture) is inputted to a position of a specific object 810 in a VR image 500, the controller 180 may zoom in to the specific object 810 in the VR image 500 only in proportion to a pinch-out extent of the inputted first VR gesture (or the inputted second VR gesture) or zoom out from the specific object 810 in the VR image 500 only in proportion to a pinch-in extent of the inputted first VR gesture (or the inputted second VR gesture).

As shown in FIG. 8 (*b*), if a first VR gesture (or a second VR gesture) is inputted not to the specific object 810 but to an object-free position in the VR image 500, the controller 180 may zoom in to the whole VR image 500 in proportion to a pinch-out extent of the inputted first VR gesture (or the inputted second VR gesture) or zoom out from the whole VR image 500 in proportion to a pinch-in extent of the inputted first VR gesture (or the inputted second VR gesture).

Meanwhile, if a first VR gesture (or a second VR gesture) is inputted to the specific object 810 in the VR image 500, the controller 180 may zoom in to the specific object 810 in the VR image 500 only in proportion to a pinch-out extent of the inputted first VR gesture (or the inputted second VR gesture). If a second VR gesture (or a first VR gesture) is inputted to the specific object 810 in the VR image 500, the controller 180 may zoom in to the specific object 810 in the VR image 500 only in proportion to a pinch-in extent of the inputted second VR gesture (or the inputted first VR gesture).

In the following, a process for performing an action related to 3D (3 dimensions) of a VR image using a first and/or second VR gesture is described in detail with reference to FIGS. 9 to 11.

FIGS. 9 to 11 are diagrams to describe a process for performing an action related to 3D (3 dimensions) of a VR image using a first VR gesture and/or a second VR gesture.

First of all, as shown in FIG. 9 (*a*), in a state that a VR image 500 in 2 dimensions (2D) is displayed, if a first VR gesture (or a second VR gesture) is inputted, as shown in FIG. 9 (*b*), the controller 180 can convert and display the 2D VR image 500 3-dimensionally.

If a first VR gesture (or a second VR gesture) is inputted to a position of a specific object in the VR image 500 in 2 dimensions (2D), the controller 180 may display the VR image 500 by 3-dimensionally converting the specific object in the 2D VR image 500 only.

In a state that first and second pointers (user's first and second fingers) of a first VR gesture (or a second VR gesture) are located at a position of a specific object in the 2D VR image 500, if the first and second pointers are rotated in a direction from a first plane space to a second plane space (or, a direction from the second plane space to the first plane space), the controller 180 may display the specific object by converting the specific object 3-dimensionally.

In a state that first and second pointers (user's first and second fingers) of a first VR gesture (or a second VR gesture) are located at a position, which is not the specific object, in the 2D VR image 500, if the first and second pointers are rotated in a direction from a first plane space to a second plane space (or, a direction from the second plane space to the first plane space), the controller 180 may convert and display the whole VR image 500 3-dimensionally.

In a state that the 2D VR image 500 is displayed, if a first VR gesture (or a second VR gesture) is inputted, the controller 180 may convert and display the VR image 500 3-dimensionally. In a state that the 3D VR image is displayed, if the second VR gesture (or the first VR gesture) is inputted, the controller 180 may convert and display the 3D VR image 500 2-dimensionally.

If a first VR gesture (or a second VR gesture) is inputted to a position of a specific object in the 2D VR image 500, the controller 180 may convert and display the specific object in the 2D VR image 3-dimensionally only. If the second VR gesture (or the first VR gesture) is inputted to a position of the converted 3D specific object, the controller 180 may convert and display the 3D specific object 2-dimensionally.

As shown in FIG. 10 (*a*), if a first VR gesture (or a second VR gesture) is inputted to a position of a 3D specific object within a 3D VR image 500, as shown in FIG. 10 (*b*), the controller 180 increases a 3D depth value of the 3D specific object in proportion to a pinch-out extent of the inputted first VR gesture (or the inputted second VR gesture) so that the specific object can be seen closer to a user. Or, the controller 180 decreases a 3D depth value of the 3D specific object in proportion to a pinch-in extent of the inputted first VR gesture (or the inputted second VR gesture) so that the specific object can be seen farther from the user.

As shown in FIG. 11 (*a*), if a first VR gesture (or a second VR gesture) is inputted to a position of a specific building 1110 within a VR image 1100 including the specific building 1110, as shown in FIG. 11 (*b*), the controller 180 can search and display an indoor image 1120 of the specific building 1110. Here, the indoor image 1120 may be stored in the memory 170 beforehand or found through a web search.

In the following, a process for scrolling to display objects in a VR image using a first and/or second VR gesture is described in detail with reference to FIGS. 12 to 14.

Figure 13:
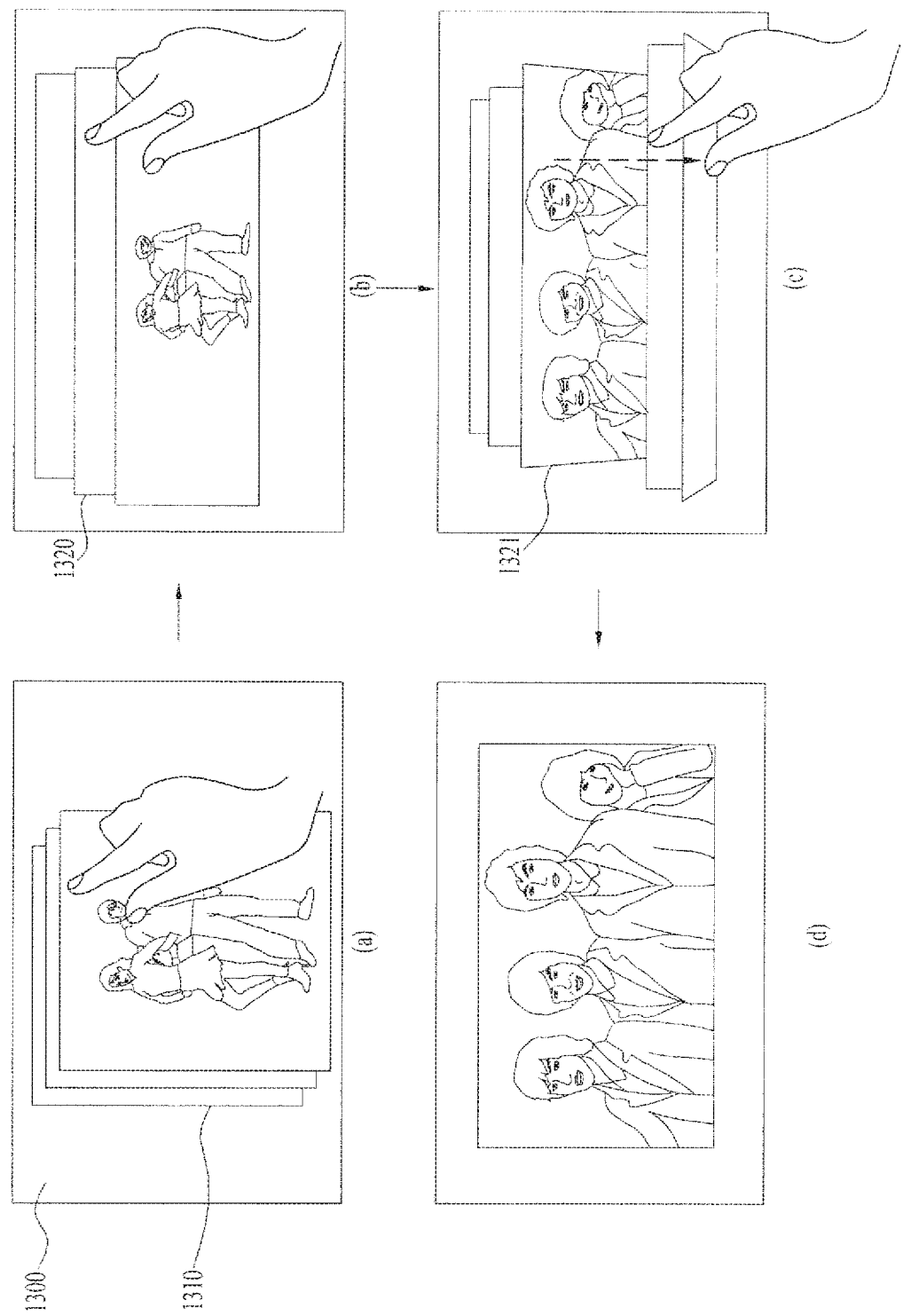

FIGS. 12 to 14 are diagrams to describe a process for displaying objects in a VR image by scrolling them using a first VR gesture and/or a second VR gesture.

First of all, as shown in FIG. 12 (*a*), the controller 180 displays a VR image 1200 including one or more objects as at least one object. In a state that first and second pointers (user's first and second fingers) of a first VR gesture (or a second VR gesture) are located at a position of a specific menu 1210 within the VR image 1200, if the first and second pointers are rotated in a direction from a first plane space to a second plane space (or a direction from the second plane space to the first plane space), the controller 180 can list and display one or more submenus subordinate to the specific menu 1210. In doing so, the controller 180 may display the one or more submenus in a manner of allocating the submenus to pages of an e-book, respectively.

Moreover, as shown in FIG. 12 (*b*), In a state that first and second pointers (user's first and second fingers) of a first VR gesture (or a second VR gesture) are located at a position free from the one or more menus within the VR image 1200, if the first and second pointers are rotated in the direction from the first plane space to the second plane space (or the direction from the second plane space to the first plane space), the controller 180 may list and display all menus included in the VR image 1200.

As shown in FIG. 13 (*a*), if a first VR gesture (or a second VR gesture) is inputted to a position of a folder 1310, in which two or more contents are grouped, in a VR image 1300, as shown in FIG. 13 (*b*), the controller 180 displays a list 1320 including items of the contents grouped in the folder 1310 in proportion to a pinch-out extent of the inputted first VR gesture (or the inputted second VR gesture) and automatically scrolls the list 1320 in a manner of scrolling items of the contents in the list 1320 in proportion to the pinch-out extent.

Thereafter, as shown in FIG. 13 (*c*), while the items of the contents in the list 1320 are scrolled, if a motion is changed as if drawing in a user direction after changing the pinch-out of the first VR gesture (or the second VR gesture) into a pinch-in, as shown in FIG. 13 (*d*), the controller 180 displays the content scrolled at the timing of the drawing as a VR image.

As shown in FIG. 14 (*a*), if a first VR gesture (or a second VR gesture) is inputted to a position of the list 1320, as shown in FIG. 14 (*b*), the controller 180 may display the content items in the list 1320 in a manner of gradually listing the content items in proportion to a pinch-out extent of the inputted first VR gesture (or the inputted second VR gesture).

Moreover, if a first VR gesture (or a second VR gesture) is inputted to a position of a specific one of the content items displayed in a manner of being listed, the controller 180 may display the list 1320 in a manner that the listed and displayed content items gradually disappear in proportion to a pinch-in extent of the inputted first VR gesture (or the inputted second VR gesture).

In the following, a process for controlling a display operation of a specific region in a VR image using a first and/or second VR gesture is described in detail with reference to FIGS. 15 to 20.

FIGS. 15 to 20 are diagrams to describe a process for controlling a display operation of a specific region in a VR image using a first VR gesture and/or a second VR gesture.

Figure 15:
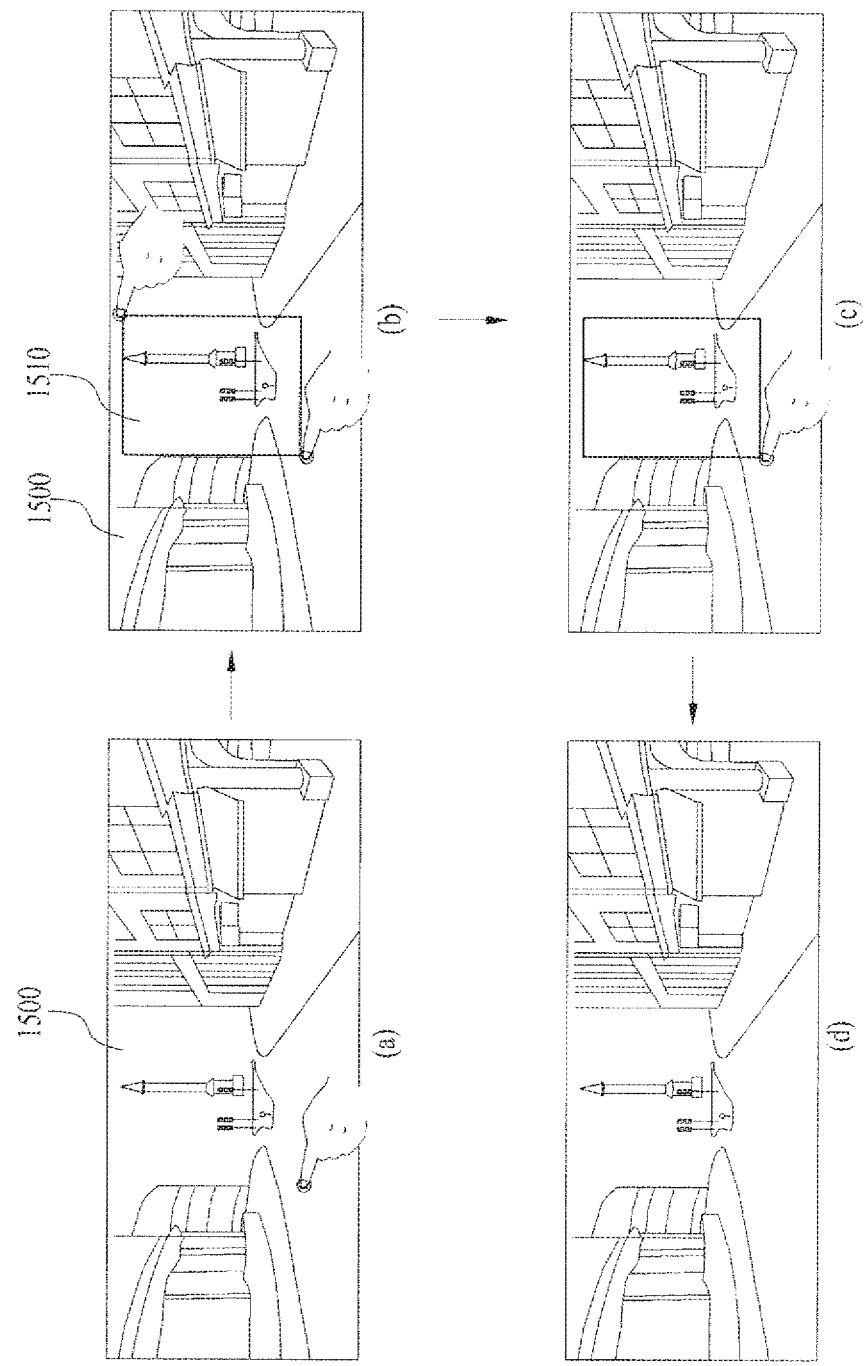

First of all, in a state that a VR image 1500 is displayed [FIG. 15 (*a*)], while a first pointer (first finger) of a user is located at a first point corresponding to a first corner of a window 1510, which is to be designated by the user, within the VR image 1500, if a second pointer (second finger) of the user is located at a second point corresponding to a second corner in a diagonal direction of the first corner within the VR image 1500 [FIG. 15 (*b*)], the controller 180 displays the window 1510 including the first and second corners.

In doing so, the controller 180 can provide an interaction independent from an outer region of the window 1510 within the VR image 1500 in response to a user's VR gesture, and more particularly, display a partial VR image displayed within the window 1510 differently from the outer region of the window 1510.

Subsequently, the controller 180 keeps displaying the window 1510 while the first pointer is located at the first point [FIG. 15 (*c*)]. If the first pointer leaves the first point, the controller 180 stops displaying the window 1510 [FIG. 15 (*d*)]. A size of the window 1510 can be adjusted in response to a change of a distance between the first and second pointers.

Figure 16:
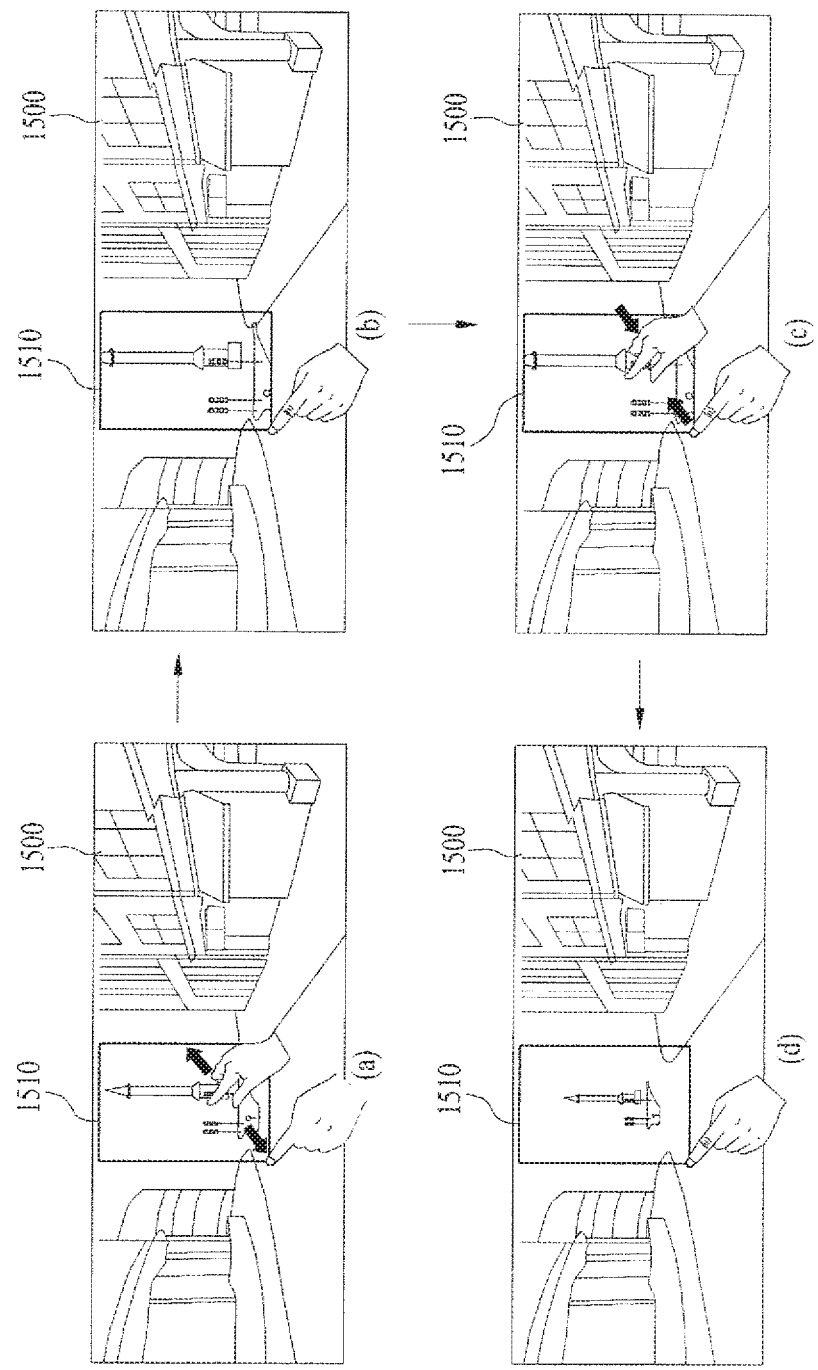

In the state that the window 1510 keeps being displayed while the first pointer is located at the first point, if a first VR gesture (or a second VR gesture) is inputted to a position within the window 1510 [FIG. 16 (*a*)], the controller 180 zooms in to a partial VR image within the window 1510 in proportion to a pinch-out extent of the inputted first VR gesture (or the inputted second VR gesture) [FIG. 16 (*b*)].

If a first VR gesture (or a second VR gesture) is inputted to a position within the window 1510 [FIG. 16 (*c*)], the controller 180 zooms out from the partial VR image within the window 1510 in proportion to a pinch-in extent of the inputted first VR gesture (or the inputted second VR gesture) [FIG. 16 (*d*)].

Figure 17:
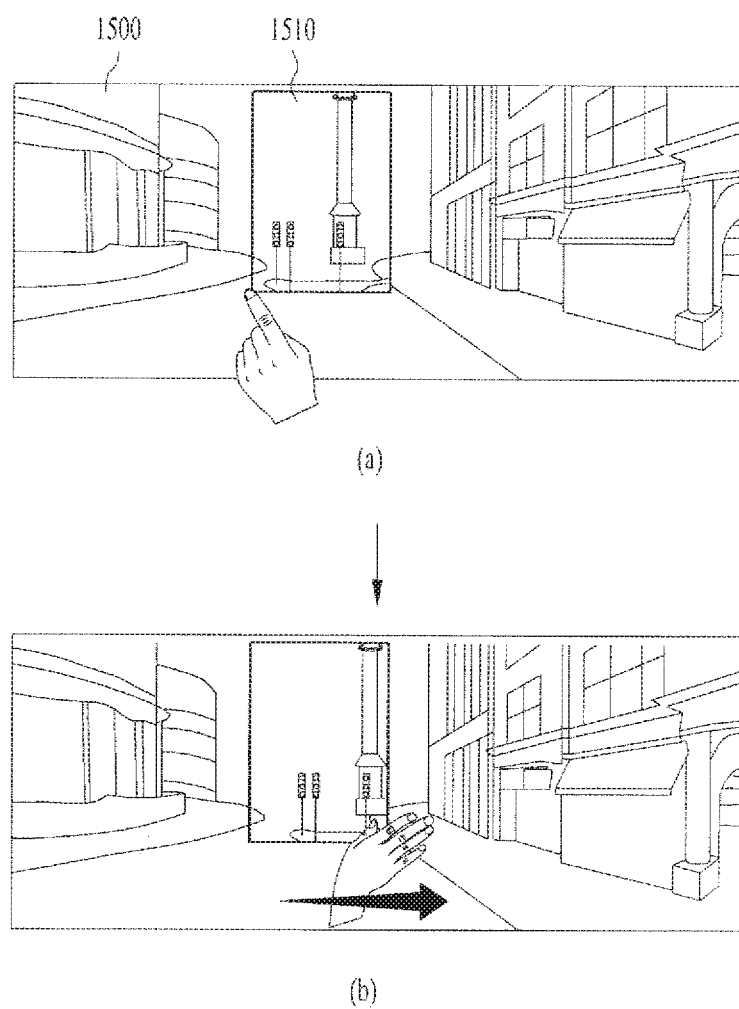

In the state that the window 1510 keeps being displayed while the first pointer is located at the first point [FIG. 17 (*a*)], if a VR gesture corresponding to a user's stroke (or flicking) action is made at the position of the window 1510 in the state that the first pointer is located at the first point, the controller 180 can rotate the partial VR image within the window 1510 in a direction of the stroke action or a 180° direction [FIG. 17 (b)].

Subsequently, in the state that the window 1510 keeps being displayed while the first pointer is located at the first point, if the second pointer is located within the window 1510 [FIG. 18 (a)], the controller displays a partial VR image 1510A displayed within the window 1510 as a full screen [FIG. 18 (b)].

Subsequently, the controller 180 displays the VR image 1500 indicating a specific road. In the state that the window 1510 keeps being displayed while the first pointer is located at the first point, if a first VR gesture (or a second VR gesture) is inputted to a position within the window 1510 [FIG. 19 (a)], the controller 180 moves a road view forward in proportion to a pinch-out extent of the inputted first VR gesture (or the inputted second VR gesture) [FIG. 19 (b)].

Figure 19:
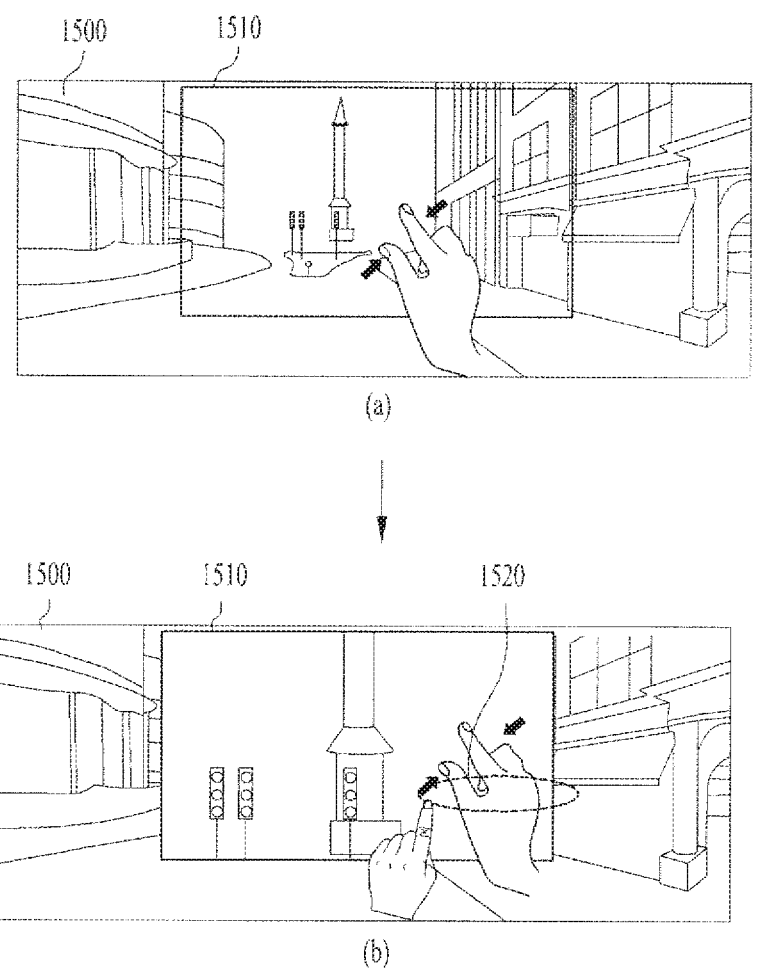

In the state that the first pointer is located at a position of a specific road 1520 within the moved road view, if a first VR gesture (or a second VR gesture) is inputted to the position of the specific road 1520, the controller 180 displays a VR image indicating the specific road 1520 in a manner that the road view is moved in a direction of the specific road 1520 [FIG. 19 (b)].

Figure 20:
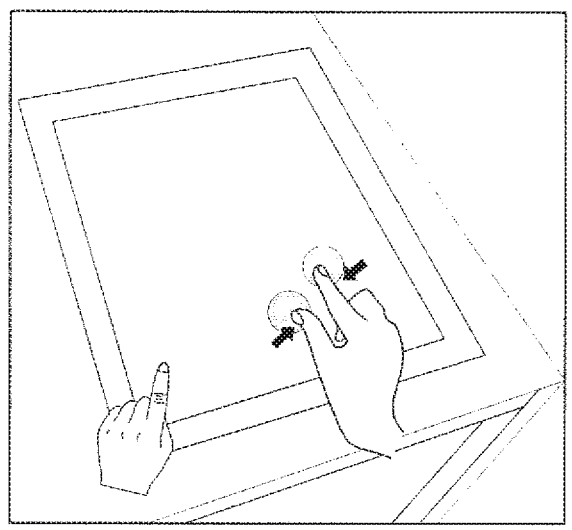

Finally, referring to FIG. 20, when a first or second VR gesture made in a first or second plane space is changed into a pinch-in (or a pinch-out) state to a pinch-out state or into a pinch-in state from a pinch-out state, if a timing of recognizing such a state change is not accurate, the controller 180 may have an error in recognizing whether a current state is a pinch-in performed state or a pinch-out performed state.

Therefore, the controller 180 of the present invention counts a pinch motion (e.g., pinch-in or pinch-out), which is performed after user's first and second pointers have been located at a position of a specific object within a VR image, once only.

Moreover, after a user's first pointer has been located at a position of a specific object in a VR image, if a pinch motion (e.g., pinch-in or pinch-out) motion is performed and the first pointer leaves the position of the specific object, the controller 180 recognizes the pinch motion (e.g., pinch-in or pinch-out) performed while the first pointer stayed at the position of the specific object.

It will be apparent to those skilled in the art that various modifications and variations can be made therein without departing from the spirit and scope of the invention.

The above-described present invention can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

Therefore, this description is intended to be illustrative, and not to limit the scope of the claims. Thus, it is intended that the present invention covers the modifications and variations of this invention provided they come within the scope of the appended claims and their equivalents.

What is claimed is:

1. A mobile terminal comprising:
at least a first artificial intelligence (AI) camera;
a display unit disposed to be viewable by a user wearing the mobile terminal, the display unit configured to display a virtual reality (VR) image extending along a first plane; and
a processor configured to:
perform an action related to the VR image in response to a VR gesture input detected through the first AI camera,
wherein, based on the detected VR gesture input comprising a VR gesture input moving along a second plane parallel to the first plane, the processor is further configured to control the display unit to display a cursor having a shape of the VR gesture input moving along the second plane, and
wherein, based on the detected VR gesture input comprising a VR gesture input moving along a third plane orthogonal to the first plane, the processor is further configured to control the display unit to display a cursor having a shape of the VR gesture input moving along the third plane.

2. The mobile terminal of claim 1, wherein the processor is further configured to:
recognize the detected VR gesture input as being the VR gesture input moving along the second plane based on the detected VR gesture input changing a distance along the second plane between a first pointer and a second pointer when the first pointer and the second pointer are located in the second plane, and
recognize the detected VR gesture input as being the VR gesture input moving along the third plane based on the detected VR gesture input changing a distance along the third plane between the first pointer and the second pointer when the first pointer and the second pointer are located in the third plane.

3. The mobile terminal of claim 2, wherein the processor is further configured to perform a different action according to a magnitude of the change in the distance along the second plane or the third plane between the first pointer and the second pointer in response to the detected VR gesture input.

4. The mobile terminal of claim 3, wherein the processor is further configured to:
when the detected VR gesture input is input at a position of a specific object included in the VR image, control the display unit to enlarge or reduce the specific object in response to the magnitude of the change in the distance along the second plane or the third plane between the first pointer and the second pointer, and
when the detected VR gesture input is input at a position different from the position of the specific object, control the display unit to enlarge or reduce the whole VR image in response to the magnitude of the change in the distance along the second plane or the third plane between the first pointer and the second pointer.

5. The mobile terminal of claim 3, wherein the processor is further configured to:
when the gesture input moving along the second plane is input at a position of a specific object included in the VR image, control the display unit to enlarge the specific object; and
when the gesture input moving along the third plane is input at the position of the specific object, control the display unit to reduce the specific object.

6. The mobile terminal of claim 3, wherein the processor is further configured to:
when the detected VR gesture input is input at a position of a 3D object in the VR image, control the display unit to change a 3D depth level of the 3D object in response to the magnitude of the change in the distance along the second plane or the third plane between the first pointer and the second pointer; and
when the detected VR gesture input is input at a position different from the position of the 3D object in the VR image, control the display unit to change a 3D depth level of the VR image in response to the magnitude of the change in the distance along the second plane or the third plane between the first pointer and the second pointer.

7. The mobile terminal of claim 3, wherein the processor is further configured to:
when the detected VR gesture input is input at a position of a 3D object in the VR image, control the display unit to rotate the 3D object in response to the magnitude of the change in the distance along the second plane or the third plane between the first pointer and the second pointer; and
when the detected VR gesture input is input at a position different from the position of the 3D object in the VR image, control the display unit to rotate the whole VR image in response to the magnitude of the change in the distance along the second plane or the third plane between the first pointer and the second pointer.

8. The mobile terminal of claim 2, wherein the processor is further configured to:
while the first pointer and the second pointer are located at a position of a specific object included in the VR image, change the specific object into a 3D object and then control the display unit to display the 3D object, when the first pointer and the second pointer are rotated in a direction from the second plane to the third plane or a direction from the third plane to the second plane; and
while the first pointer and the second pointer are located at a position different from the position of the specific object in the VR image, change the whole VR image into a 3D image and then control the display unit to display the 3D image, when the first pointer and the second pointer are rotated in the direction from the second plane to the third plane or the direction from the third plane to the second plane.

9. The mobile terminal of claim 1, wherein the processor is further configured to:
when the VR gesture input moving along the second plane or the VR gesture input moving along the third plane is input at a position of at least a first object included in the VR image, control the display unit to list and display sub-objects subordinate to the first object; and
when the VR gesture input moving along the second plane or the VR gesture input moving along the third plane is input at a position different from the position of the at least the first object in the VR image, control the display unit to list and display all objects included in the VR image.

10. A method of controlling a mobile terminal, the method comprising:
displaying a virtual reality (VR) image extending along a first plane;
detecting, by a first artificial intelligence (AI) camera, a VR gesture input moving along a second plane parallel to the first plane;
based on the detected VR gesture input moving along the second plane, displaying a cursor having a shape of the VR gesture input moving along the second plane;
detecting, by the first AI camera, a VR gesture input moving along a third plane orthogonal to the first plane; and
based on the detected VR gesture input moving along the third plane, displaying a cursor having a shape of the VR gesture input moving along the third plane.

11. The method of claim 10, wherein:
detecting the VR gesture input moving along the second plane comprises recognizing that the VR gesture input moving along the second plane changes a distance along the second plane between a first pointer and a second pointer when the first pointer and the second pointer are located in the second plane, and
detecting the VR gesture input moving along the third plane comprises recognizing that the VR gesture input moving along the third plane changes a distance along the third plane between the first pointer and the second pointer when the first pointer and the second pointer are located in the third plane.

12. The method of claim 11, further comprising:
performing a different action according to a magnitude of the change in the distance along the second plane or the third plane between the first pointer and the second pointer in response to the VR gesture input moving along the second plane or the VR gesture input moving along the third plane.

13. The method of claim 12, wherein performing the different action comprises:
when the VR gesture input moving along the second plane or the VR gesture input moving along the third plane is input at a position of a specific object included in the VR image, enlarging or reducing the specific object in response to the magnitude of the change in the distance along the second plane or the third plane between the first pointer and the second pointer; and
when the VR gesture input moving along the second plane or the VR gesture input moving along the third plane is input at a position different from the position of the specific object, enlarging or reducing the whole image in response to the magnitude of the change in the distance along the second plane or the third plane between the first pointer and the second pointer.

14. The method of claim 12, wherein performing the different action comprises:
when the VR gesture input moving along the second plane is input at a position of a specific object included in the VR image, enlarging the specific object; and
when the VR gesture input moving along the third plane is input at the position of the specific object, reducing the specific object.

15. The method of claim 12, wherein:
when the VR gesture input moving along the second plane or the VR gesture input moving along the third plane is input at a position of a 3D object in the VR image, changing a 3D depth level of the 3D object in response to the magnitude of the change in the distance along the second plane or the third plane between the first pointer and the second pointer; and
when the VR gesture input moving along the second plane or the VR gesture input moving along the third plane is input at a position different from the position of the 3D object in the image, changing a 3D depth level of the VR image in response to the magnitude of the change in the distance along the second plane or the third plane between the first pointer and the second pointer.

16. The method of claim 12, wherein:
when the VR gesture input moving along the second plane or the VR gesture input moving along the third plane is input at a position of a 3D object in the VR image, rotating the 3D object in response to the magnitude of the change in the distance along the second plane or the third plane between the first pointer and the second pointer; and
when the VR gesture input moving along the second plane or the VR gesture input moving along the third plane is input at a position different from the position of the 3D object in the VR image, rotating the whole VR image in response to the magnitude of the change in the distance along the second plane or the third plane between the first pointer and the second pointer.

17. The method of claim 11, further comprising:
while the first pointer and the second pointer are located at a position of a specific object included in the VR image, changing the specific object into a 3D object and then displaying the 3D object, when the first pointer and the second pointer are rotated in a direction from the second plane to the third plane or a direction from the third plane to the second plane; and
while the first pointer and the second pointer are located at a position different from the position of the specific object in the VR image, changing the whole image into a 3D image and then displaying the 3D image, when the first pointer and the second pointer are rotated in the direction from the second plane to the third plane or the direction from the third plane to the second plane.

18. The method of claim 10, further comprising:
when the VR gesture input moving along the second plane or the VR gesture input moving along the third plane is input at a position of at least a first object included in the VR image, listing and displaying sub-objects subordinate to the first object; and
when the VR gesture input moving along the second plane or the VR gesture input moving along the third plane is input at a position different from the position of the at least the first object in the image, listing and displaying all objects included in the image.

\* \* \* \* \*